(12) United States Patent
Hause et al.

(10) Patent No.: US 8,495,817 B2
(45) Date of Patent: Jul. 30, 2013

(54) TRANSMISSION ASSEMBLY FOR A STRING TRIMMER

(75) Inventors: Kevin M. Hause, Binghamton, NY (US); George M. Scherer, Binghamton, NY (US); Andrew J. Leslie, Vestal, NY (US)

(73) Assignee: Actuant Corporation, Menomonee Falls, WI (US)

( * ) Notice: Subject to any disclaimer, the term of this patent is extended or adjusted under 35 U.S.C. 154(b) by 708 days.

(21) Appl. No.: 12/701,139

(22) Filed: Feb. 5, 2010

(65) Prior Publication Data

US 2010/0192386 A1 Aug. 5, 2010

Related U.S. Application Data

(60) Provisional application No. 61/206,872, filed on Feb. 5, 2009.

(51) Int. Cl.
*A01D 34/416* (2006.01)
(52) U.S. Cl.
USPC .................................................. 30/276; 83/13
(58) Field of Classification Search
USPC ..................... 30/276; 464/52; 83/13
See application file for complete search history.

(56) References Cited

U.S. PATENT DOCUMENTS

| | | | | |
|---|---|---|---|---|
| 1,590,619 A | * | 6/1926 | Ernst | 451/241 |
| 2,915,306 A | * | 12/1959 | Hickman | 267/280 |
| 2,929,408 A | * | 3/1960 | Smith et al. | 138/38 |
| 3,686,896 A | * | 8/1972 | Rutter | 464/52 |
| 3,839,882 A | * | 10/1974 | Gilarski, Jr. | 73/519.01 |
| 4,126,928 A | * | 11/1978 | Hoff | 29/445 |
| 4,237,610 A | * | 12/1980 | Bradus et al. | 30/276 |
| 4,335,585 A | * | 6/1982 | Hoff | 464/52 |
| 4,416,644 A | * | 11/1983 | Kulischenko et al. | 464/52 |
| 4,451,983 A | * | 6/1984 | Johnson et al. | 30/276 |
| 4,953,294 A | * | 9/1990 | Dohse | 30/276 |
| 5,175,932 A | * | 1/1993 | Lange et al. | 30/276 |
| 5,339,526 A | * | 8/1994 | Everts | 30/276 |
| 5,364,307 A | * | 11/1994 | Shaulis | 464/52 |
| 5,599,233 A | * | 2/1997 | Shaulis | 464/52 |
| 5,695,404 A | * | 12/1997 | Shaulis | 464/52 |
| 5,839,961 A | * | 11/1998 | Andress | 464/52 |
| 5,931,736 A | | 8/1999 | Scherer et al. | |
| 6,010,407 A | * | 1/2000 | Ishikawa | 464/52 |
| 6,751,871 B2 | * | 6/2004 | Furnish | 30/276 |
| 6,913,539 B1 | | 7/2005 | Scherer | |
| 6,986,713 B2 | * | 1/2006 | Dine et al. | 464/181 |
| 7,374,492 B2 | * | 5/2008 | Karlsson | 464/52 |
| 8,020,304 B2 | * | 9/2011 | Mace et al. | 30/381 |
| 2008/0119292 A1 | * | 5/2008 | Kragner et al. | 464/52 |
| 2012/0240694 A1 | * | 9/2012 | Isobe et al. | 74/25 |

* cited by examiner

*Primary Examiner* — Jerry Redman
(74) *Attorney, Agent, or Firm* — Quarles & Brady

(57) ABSTRACT

A transmission assembly for a string trimmer is disclosed. The transmission assembly comprises a liner that includes a sleeve. The sleeve includes an inner surface that defines a passageway for a rotatable core, and the sleeve further includes an outer surface. The liner further includes a plurality of legs that project from the outer surface, and a retainer projection disposed at a position axially adjacent to the plurality of legs. The transmission assembly further comprises a retainer that is held to the liner by the retainer projection. The retainer is configured to axially and radially restrain the liner relative to an outer down-tube.

20 Claims, 11 Drawing Sheets

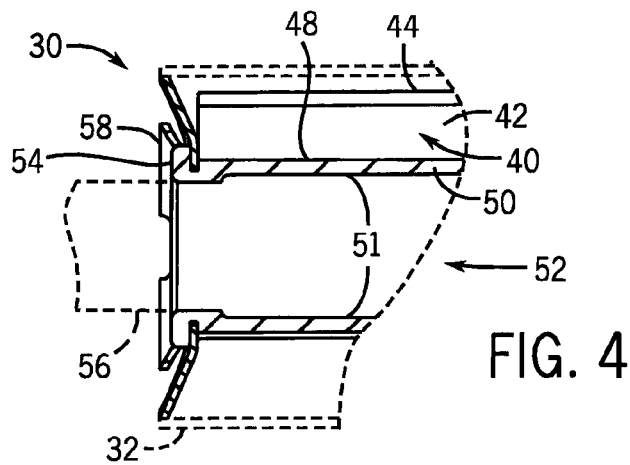
FIG. 4
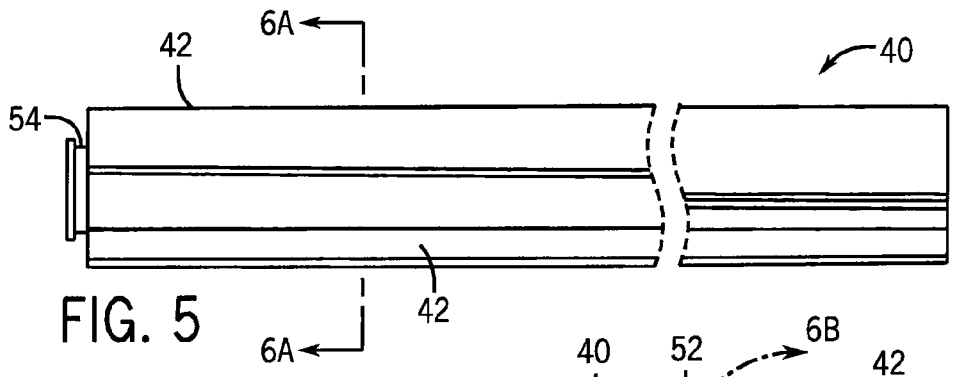
FIG. 5
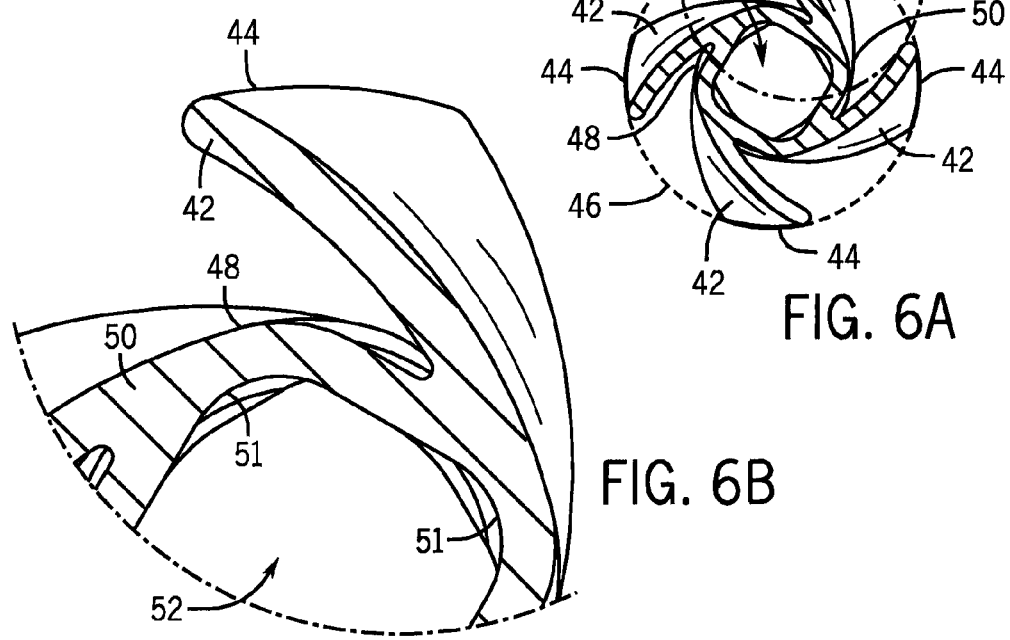
FIG. 6A
FIG. 6B

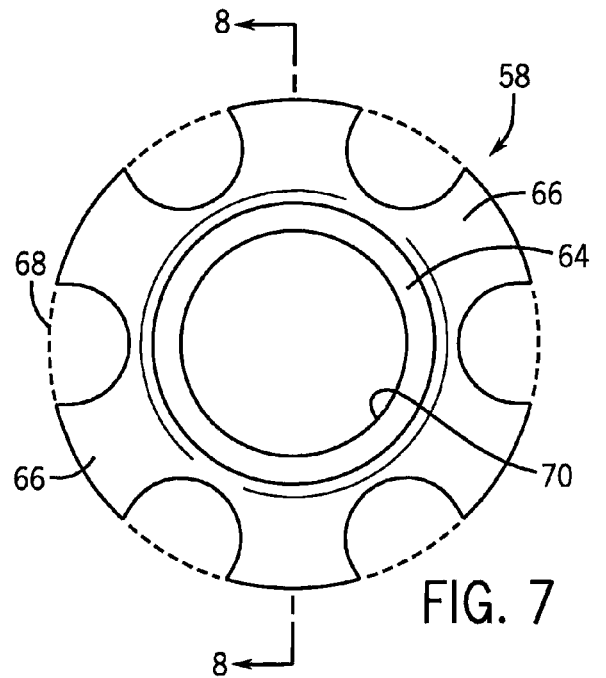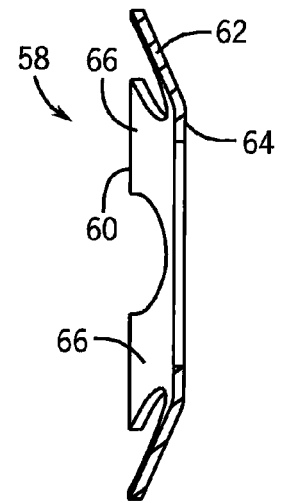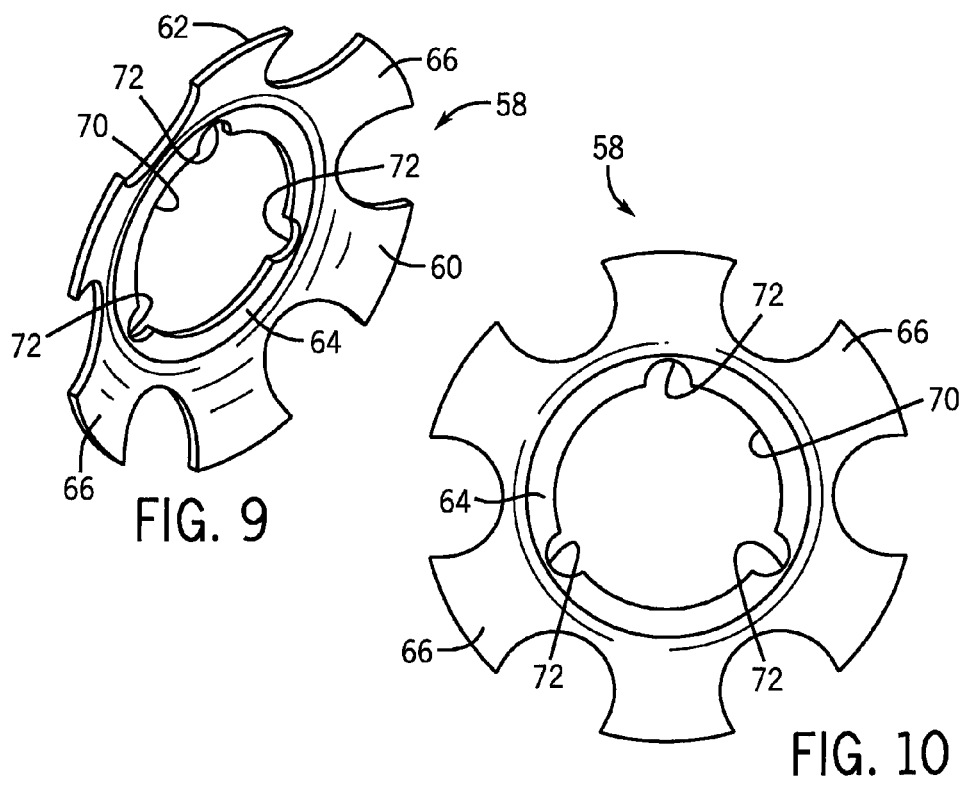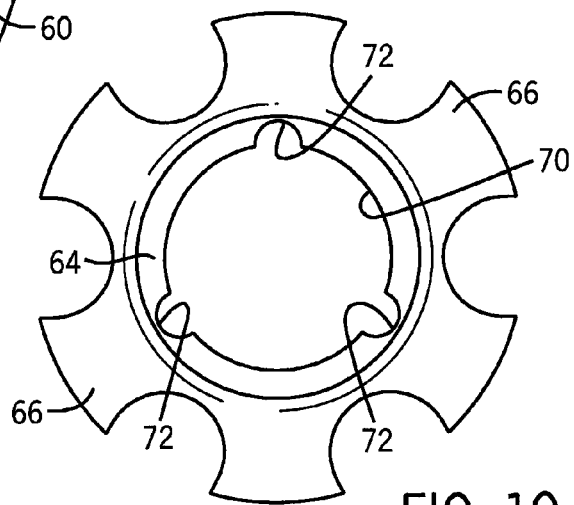
FIG. 7
FIG. 8
FIG. 9
FIG. 10

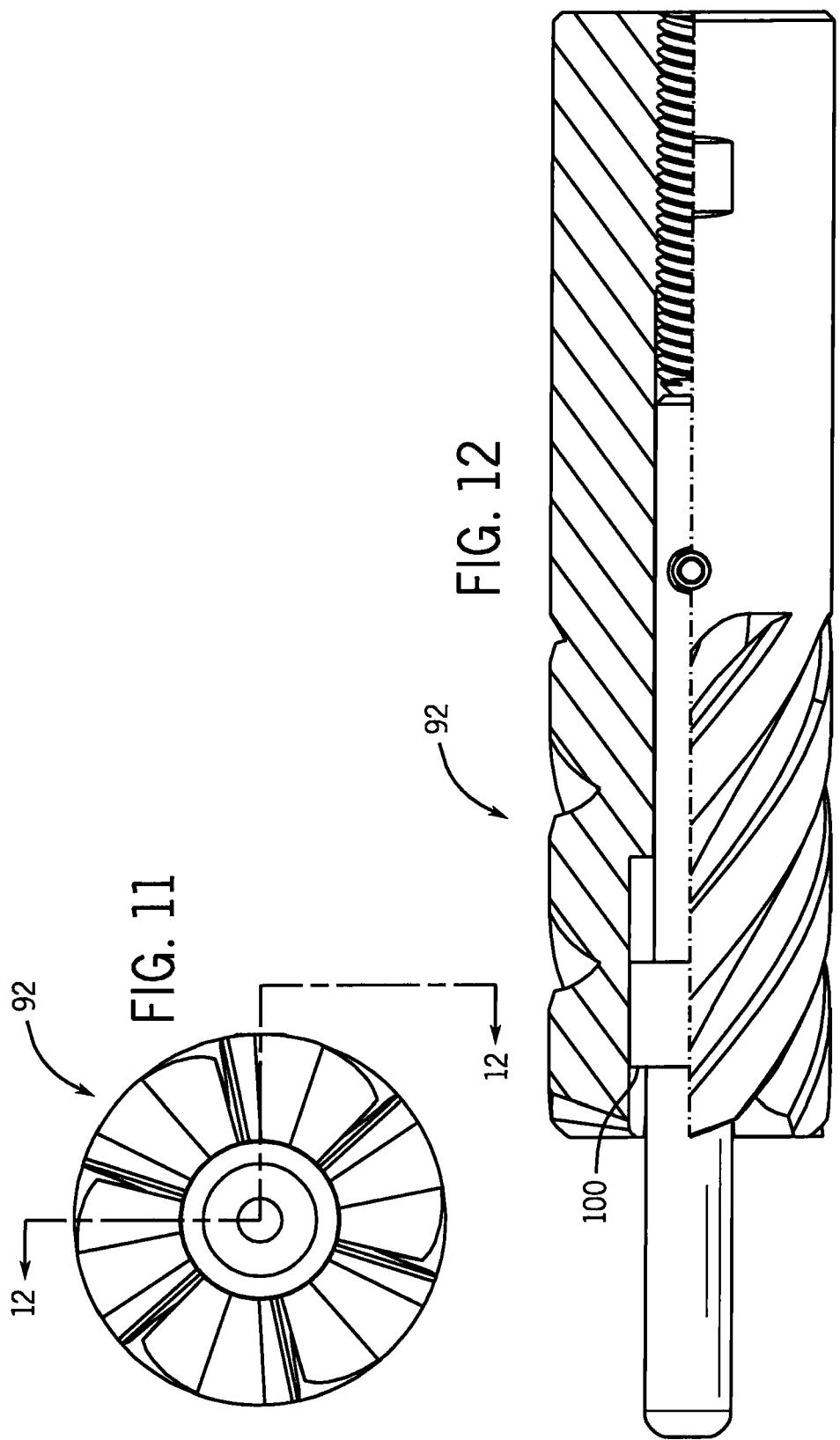

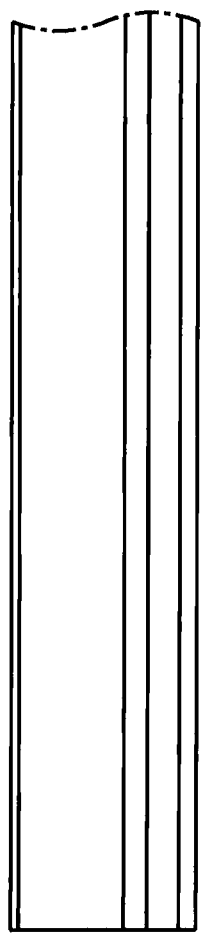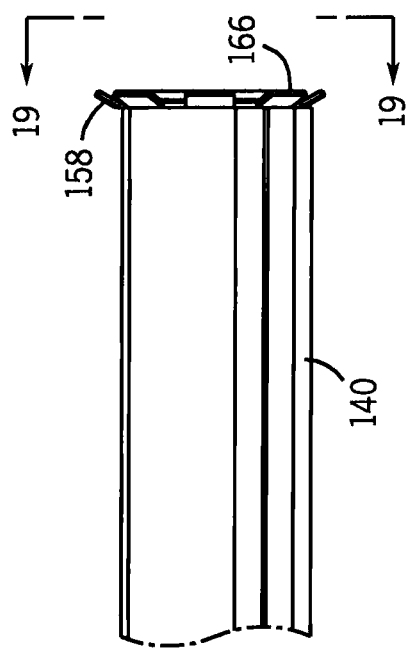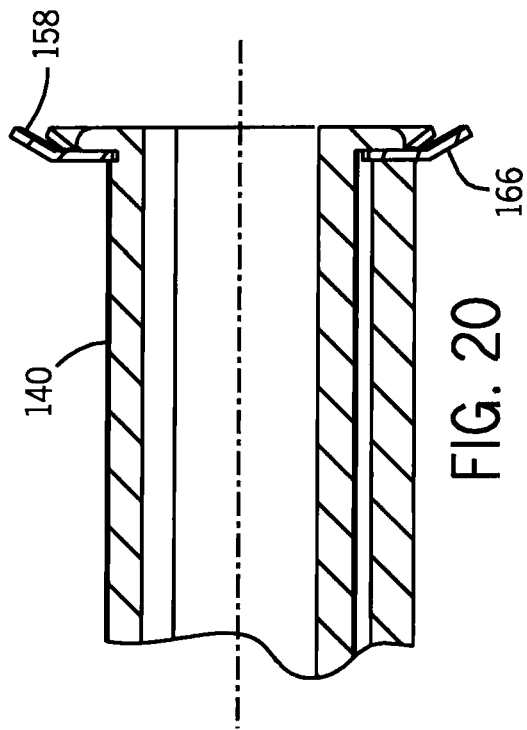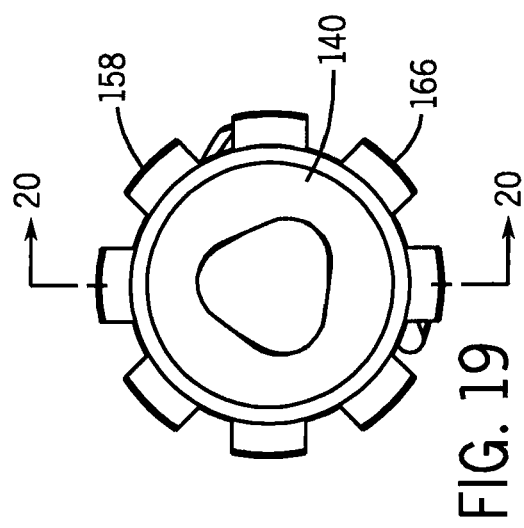

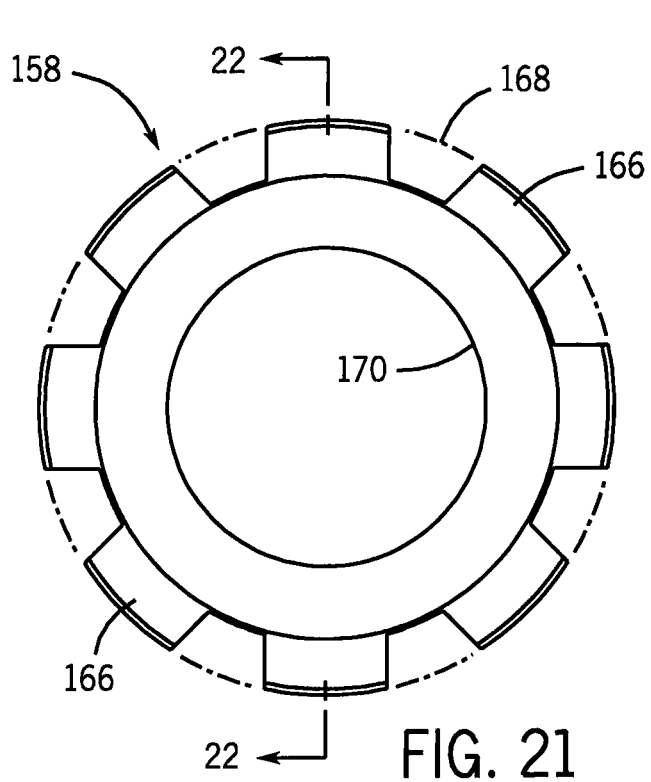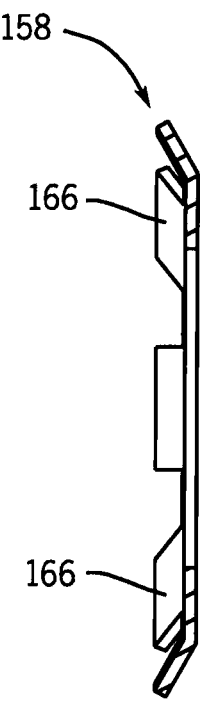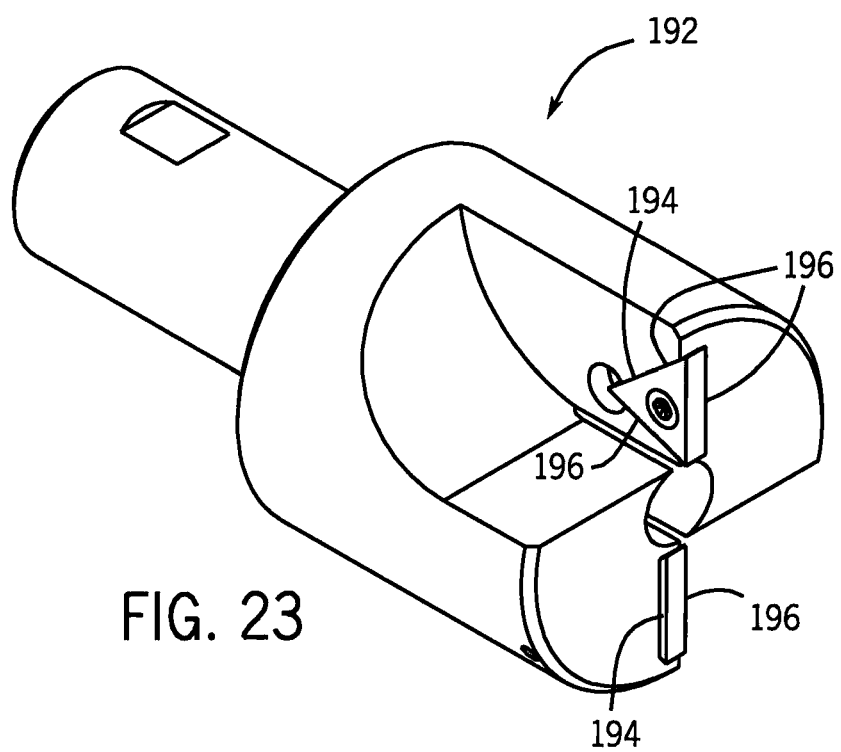

TRANSMISSION ASSEMBLY FOR A STRING TRIMMER

CROSS-REFERENCE TO RELATED APPLICATION

This application claims the benefit of U.S. Provisional Patent Application No. 61/206,872 filed Feb. 5, 2009, the disclosure of which is hereby incorporated by reference in its entirety.

STATEMENT CONCERNING FEDERALLY SPONSORED RESEARCH OR DEVELOPMENT

Not applicable.

FIELD OF THE INVENTION

This invention relates to flexible transmission assemblies, and particularly to flexible and curved transmission assemblies for string trimmers.

BACKGROUND OF THE INVENTION

String trimmers are well-known devices for yard and lawn maintenance that may be used to easily accomplish tasks that may be difficult for other devices, such as trimming plants near a sidewalk or a wall. A number of types of string trimmers are known in the art; for example, some designs include a battery and an electric motor to provide rotary motion for trimming plants. As another example, other designs include an internal combustion engine to provide rotary motion.

In any case, most string trimmer designs include a power source (e.g., the electric motor or internal combustion engine) that connects through an elongated transmission assembly to a rotary whip assembly that engages and trims plants. The power source and the rotary whip assembly are positioned at opposite ends of the transmission assembly to distribute the weight of the trimmer and reduce the amount of torque that must be applied by a user to hold the trimmer. In addition, the transmission assembly typically has a curved or bent shape to provide a design in which the rotary assembly can be positioned away from the user and oriented to effectively trim plants.

The transmission assembly of a typical string trimmer includes a hollow outer tube, or a "down-tube", and a flexible plastic liner that generally centers a rotatable drive shaft, or a "core", within the down-tube. A core is typically constructed of multiple helically wound metal wires to provide flexibility. In some designs, the flexibility of the core permits the core to bend to follow the curve of the down-tube and directly connect the power source to the rotary whip assembly. In other designs, multiple liners and cores are housed in a single down-tube and the cores connect to one another at the bend of the down-tube.

However, the transmission assemblies of current string trimmer designs include several drawbacks. For example, the core needs to be accurately centered at certain locations along the length of the down-tube, such as interfaces with other components, to prevent excessive wear. However, a typical liner may not be able to accurately center a core due to the inherent flexibility of the liner, particularly where the core exits the down-tube, and especially at the lower end of the down-tube if the down-tube is curved at the lower end. As another example, rotation of the helical core may cause a "threading" and "unthreading" motion against the liner and the liner may shift axially within the down-tube. This motion may cause the liner to wear and reduce its effectiveness for generally centering the core.

Considering the limitations of current transmission assemblies for string trimmers, a need exists for an assembly with an accurately centered core in at least some positions within the down-tube. A need also exists for such an assembly to restrain the flexible liner relative to the down-tube. Further still, a need also exists for such an assembly that is easily and inexpensively manufactured.

SUMMARY OF THE INVENTION

In one aspect, the present invention provides a transmission assembly for a string trimmer. The transmission assembly comprises a liner that includes a sleeve. The sleeve includes an inner surface that defines a passageway for a rotatable core, and the sleeve further includes an outer surface. The liner further includes a plurality of legs that project from the outer surface, and a retainer projection disposed at a position axially adjacent to the plurality of legs. The transmission assembly further comprises a retainer that is held to the liner by the retainer projection. The retainer is configured to axially and radially restrain the liner relative to the outer down-tube of the string trimmer.

In another aspect, the transmission assembly comprises a liner that includes a sleeve. The sleeve includes an inner surface that defines a passageway for a rotatable core, and the sleeve further includes an outer surface opposite the inner surface. The liner further includes a plurality of legs that project tangentially from the outer surface, and a retainer projection defined by the sleeve at a position axially adjacent to the plurality of legs. The transmission assembly further comprises a retainer that is axially restrained relative to the liner by the retainer projection. The retainer includes a plurality of fingers that are configured to engage an outer down-tube and axially and radially restrain the liner relative to the outer down-tube.

In yet another aspect, the present invention provides a method of forming a transmission assembly for a string trimmer, comprising the steps of: providing a liner that comprises a sleeve that includes an inner surface that defines a passageway. The sleeve further includes an outer surface. The liner further comprises a plurality of legs that project from the outer surface, and a retainer projection that is disposed at a position axially adjacent to the plurality of legs. The method further comprises the step of securing a retainer to the liner using the retainer projection. The retainer is configured to axially and radially restrain the liner relative to an outer down-tube.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 4 is a sectional view of the transmission assembly along line 4-4 of FIG. 2;

FIG. 5 is a side view of a flexible liner of the transmission assembly of FIG. 2;

FIG. 6A is a sectional view of the flexible liner along line 6A-6A of FIG. 5;

FIG. 6B is a detail view of the flexible liner within the line 6B-6B of FIG. 6A;

FIG. 7 is a top view of a retainer of the transmission assembly of FIG. 2;

FIG. 8 is a sectional view of the retainer along line 8-8 of FIG. 7;

FIG. 9 is a perspective view of an alternative retainer design;

FIG. 10 is a top view of the alternative retainer design of FIG. 9;

FIG. 11 is a photograph of a skiving tool used in manufacturing the flexible liner of the transmission assembly;

FIG. 12 is a photograph of a skiving tool of the skiving tool of FIG. 11;

FIG. 18 is a side view of a second embodiment of the retainer connected to the flexible liner;

FIG. 19 is a front view of the retainer and the liner along line 19-19 of FIG. 18;

FIG. 20 is a sectional view of the retainer and the liner along line 20-20 of FIG. 19;

FIG. 21 is a top view of the second embodiment of the retainer FIG. 18;

FIG. 22 is a sectional view of the retainer along line 22-22 of FIG. 21;

FIG. 23 is a perspective view of a second embodiment of a skiving tool used in manufacturing the flexible liner;

DETAILED DESCRIPTION OF THE PREFERRED EMBODIMENT

Figure 1:
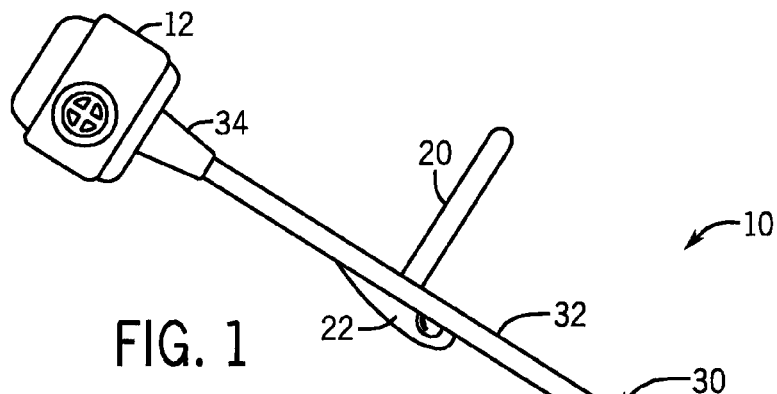
FIG. 1 is a side view of a string trimmer incorporating a transmission assembly of the present invention.

Referring to FIG. 1, a string trimmer 10 incorporating a transmission assembly 30 of the present invention is shown. The string trimmer 10 also includes a power source 12, such as a battery and electric motor, an internal combustion engine, or the like, that powers a rotary whip assembly 14 that engages and trims plants. The rotary whip assembly 14 includes a rotatable housing 16 that supports one or more plant cutting strings 18, which should be understood to include plastic cords and other similar cutting elements that are commonly used with string trimmers. The string trimmer 10 may also include a support handle 20 and a throttle lever 22 mounted to the transmission assembly 30 that are manipulated by a user. Other components or general string trimmer designs known to those skilled in the art may also be used.

The power source 12 powers the rotary whip assembly 14 through the transmission assembly 30, which generally includes a rigid tube that houses flexible inner components. Specifically, the transmission assembly 30 includes a hollow outer tube or a "down-tube" 32 formed of a metal, a generally rigid plastic, or the like. The down-tube 32 is an elongated hollow component that may include flared ends 34 and 36 to connect to the power source 12 and the rotary whip assembly 14, respectively. In addition, the down-tube 32 may have a curve or bend 38 to provide an effective and easily used trimmer design. In an exemplary embodiment, the down-tube 32 may have an inner diameter of about 0.9 in.; however, the size and overall length of the down-tube 32 may vary depending on the size and power output of the trimmer 10.

Referring now to FIGS. 2-6, the down-tube 32 houses a flexible liner 40 (shown separately in FIGS. 5, 6A and 6B) that may generally extend through the entire or nearly the entire length of the down-tube 32. Alternatively, the transmission assembly 30 may include multiple separate flexible liners 40 as described in further detail below. In general, the liner 40 may be as described in U.S. Pat. No. 6,913,539, the disclosure of which is hereby incorporated by reference. As such, the liner 40 may be made from nylon or another appropriate material, such as a material that is strong and flexible as well as resistant to wear and lubricants.

The liner 40 includes a plurality of legs 42 that generally center the liner 40 in the down-tube 32. Different numbers of legs 42 and leg shapes may be used; in an exemplary embodiment in which the down-tube 32 includes a bend, the liner 40 includes four elliptical-shaped and tangentially projecting legs 42. In alternative embodiments, such as embodiments in which the down-tube 32 is straight, the liner 40 may include three elliptical-shaped and tangentially projecting legs. Furthermore, in some embodiments, each leg may project radially relative to the down-tube 32. Each leg 42 includes a distal end 44 and extends helically along the length of the liner 40. In alternative embodiments, the legs 42 could extend straightly along the length of the liner 40. The distal ends 44 also define an effective outer diameter 46 of the liner 40 as shown in FIG. 6 which is equal to or slightly smaller than the inside diameter of the down-tube 32.

Referring specifically to FIGS. 4, 6A and 6B, each leg 42 includes an end opposite the distal end 44 that connects to an outer surface 48 of a sleeve 50. The sleeve 50 includes an inner passageway 52 opposite the outer surface 48 that may be shaped to have lobes or grooves 51 that retain lubricant therein over the length of the liner 40, as described in further detail below. The sleeve 50 also defines a rivet-shaped retainer projection 54 (FIG. 5) at an end axially adjacent to the legs 42. The retainer projection 54 is described in further detail below.

Referring again to FIGS. 2-4, the inner passageway 52 of the sleeve 50 houses a rotatable drive shaft or a "core" 56 that rotates inside the liner 40 to provide power from the power source 12 to the rotary whip assembly 14. The core 56 may include square ends that connect to male/female couplings (not shown) that engage the power source 12 and the rotary whip assembly 14. Alternatively, the transmission assembly 30 may include multiple cores 56 connected to one another in embodiments in which the transmission assembly 30 includes multiple liners 40. In any case, the core 56 may generally be any appropriate core known to those skilled in art. As such, the core 56 is a flexible component that comprises multiple helically wound metal wires.

Referring now to FIGS. 2-4, 7 and 8, the transmission assembly 30 further includes a retainer 58 that is connected to the liner 40 by the retainer projection 54. The retainer 58 advantageously engages the down-tube 32 to radially and axially restrain the liner 40 relative to the down-tube 32. The retainer 58 also permits the liner 40 to accurately center the core 56 proximate the retainer 58. In an exemplary embodiment, the retainer 58 is disposed in the down-tube 32 adjacent the lower flared end 36; however, the retainer 58 may also be disposed within the lower flared end 36, within the upper flared end 34, adjacent the upper flared end 34, at any other practical position in the down-tube 32, or multiple retainers 58 may be disposed at a combination of the above positions.

Figure 3:
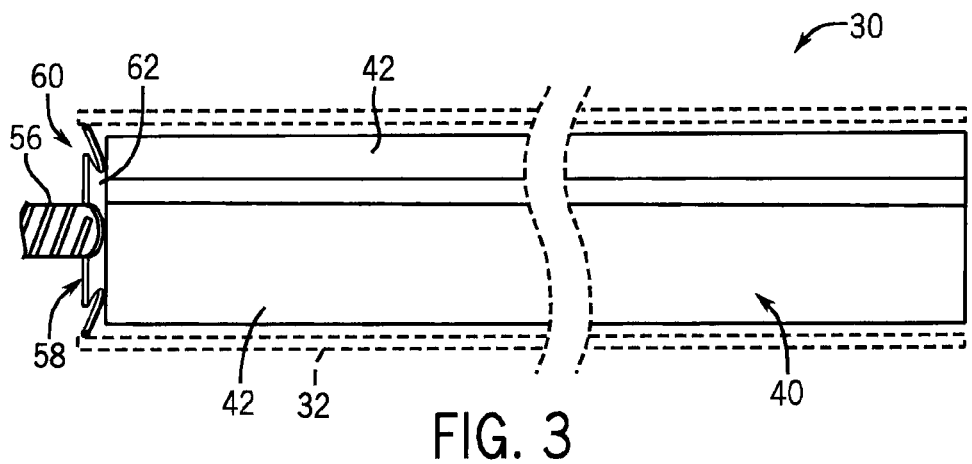
FIG. 3 is a side view of the transmission assembly of FIG. 2 with a down-tube partially hidden.

The retainer 58 has a concave surface 60 and an opposite convex surface 62 that are offset from a retainer base 64 by about 25 degrees. The surfaces 60 and 62 advantageously provide high resistance to movement in one direction, i.e. the direction faced by the concave surface 60, and less resistance to movement in the opposite direction, i.e. the direction faced by the convex surface 62. As shown in FIGS. 3 and 4, the concave surface 60 preferably faces axially away from the legs 42 of the liner 40, although the orientation of the retainer 58 may be reversed in alternative embodiments.

In a first embodiment the retainer 58 is a spring washer, such as part nos. 562HT11004406800 (lightly oiled finish) or 562ZP11004406800 (zinc plated) available from Carpin Manufacturing Inc. of Waterbury, Conn. As such, the retainer is preferably made from 1050-1074 steel with a thickness of about 0.016 in. The retainer 58 includes a plurality of fingers 66 (e.g., six fingers) that engage the inner diameter of the down-tube 32 and define an effective outer diameter 68 of about 0.954 in. in an exemplary embodiment. In some embodiments, the effective outer diameter 68 is larger than the effective outer diameter 46 of the liner 40. The retainer 58 also includes an inner diameter 70 of about 0.440 in. in an exemplary embodiment. Referring to FIGS. 9 and 10, in some embodiments, the inner diameter 70 may include one or more slots or keyways 72 that accommodate one or more projecting keys (not shown) on the liner 40. The keys may be formed during the ultrasonic welding operation described below. As a result, the liner 40 is rotatably restrained relative to the retainer 58 and the down-tube 32 in these embodiments.

Referring now to FIGS. 18-22, in a second embodiment the retainer 158 is a retention washer, such as part no. 2715-11-LF available from Seastrom Manufacturing Co. of Twin Falls, Mont. As such, the retainer 158 is preferably made from commercial spring steel with a thickness of about 0.015 in. Like the first embodiment, the retainer 158 includes a plurality of fingers 166 (e.g., eight fingers) that engage the inner diameter of the down-tube and define an effective outer diameter 168 of about 0.704 in. in an exemplary embodiment. As such, the retainer 158 is appropriate for use with a smaller down-tube compared to that of the first embodiment of the retainer 58.

Furthermore, the retainer 158 is also appropriate for use with a smaller liner 140 compared to that of the first embodiment of the retainer 58. The effective outer diameter of the liner 140 may be smaller than the effective outer diameter 168 of the retainer 158. Furthermore, the retainer 158 also includes an inner diameter 170 of about 0.390 in. in an exemplary embodiment. In some embodiments, the inner diameter 170 may include one or more slots or keyways (not shown) into which would fit corresponding projecting keys (not shown) formed on the liner 140 to rotatably restrain the liner 140 relative to the retainer 158 and the down-tube 32 in these embodiments.

Referring now to FIGS. 11-17 and 23-27, the transmission assembly 30 of the present invention is preferably manufactured as follows. Only the first embodiment of the retainer 58 is described for simplicity, although the same manufacturing steps may be used with the second embodiment of the retainer 158. First, the liner 40 is created using a well-known process for forming elongated components, such as extrusion. The extrusion process may provide a longer section from which an appropriate length may be cut to provide the liner 40.

Figure 13:
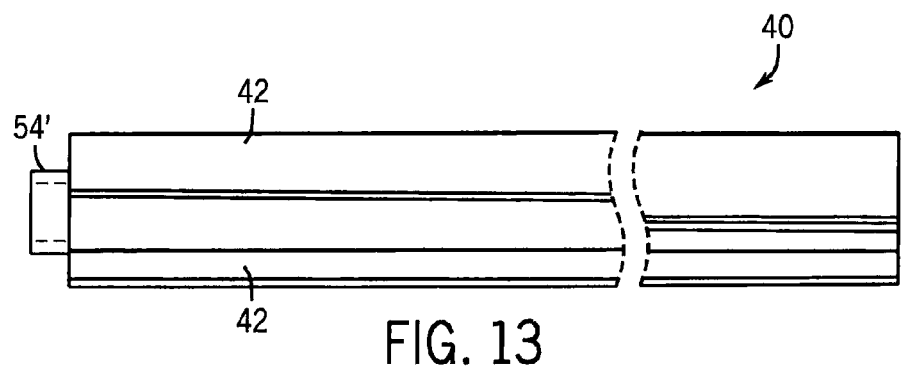
FIG. 13 is a side view of the flexible liner after use of the skiving tool of FIG. 11.
Figure 16:
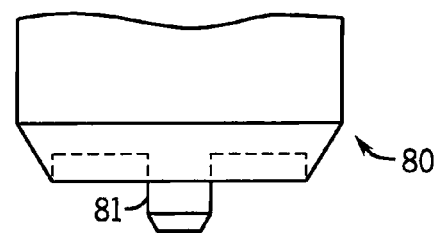
FIG. 16 is a side view of the ultrasonic welding tip of FIG. 15.
Figure 17:
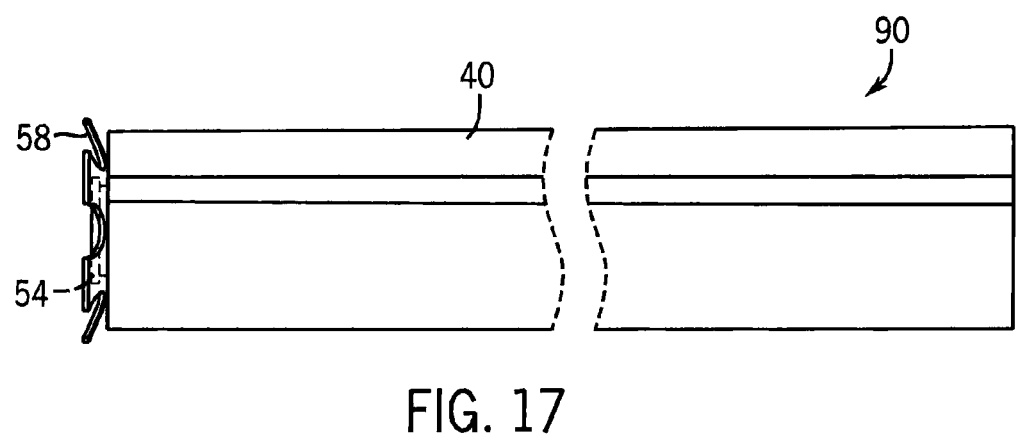
FIG. 17 is a side view of the liner and retainer assembly after use of the ultrasonic welding apparatus of FIG. 14.

Next, a preliminary retainer projection 54' is formed on one or more ends of the liner 40 using a skiving tool 92 as shown in FIGS. 11 and 12. In alternative embodiments, the skiving tool 192 may support one or more cutting insert tips 194 as shown in FIGS. 23-26. The cutting insert tips 194 may comprise any appropriate cutting material, such as carbides, diamond, and the like. Each cutting insert tip 194 may include multiple cutting edges 196 that are moved into a cutting position at the front of the tool 192 after an adjacent cutting edges 196 are worn. Furthermore, unlike the first embodiment of the skiving tool 92, only the cutting insert tips 194 are replaced after they are worn instead of the entire tool. Regardless of the specific shape of the tool, the skiving tool 92 or 192 is driven by a rotary motor 98 (FIG. 27) and axially removes a portion of the legs 42 to provide the projection 54' and the liner 40 as shown in FIG. 13. The length of the projection 54' is determined by the position of a collar 100 (FIG. 12) disposed within the skiving tool 92.

Figure 14:
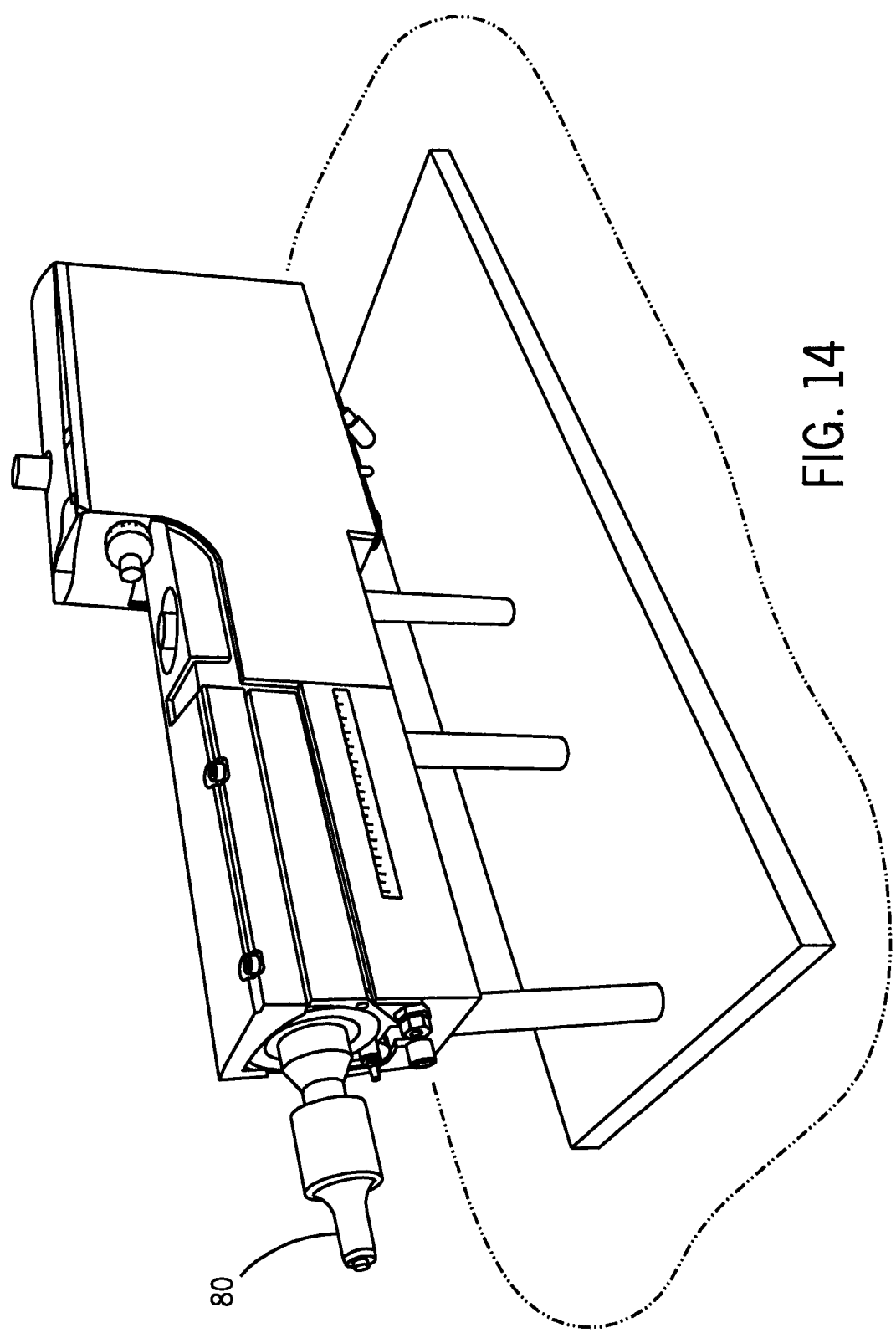
FIG. 14 is a photograph of an ultrasonic welding apparatus used in manufacturing the transmission assembly.
Figure 15:
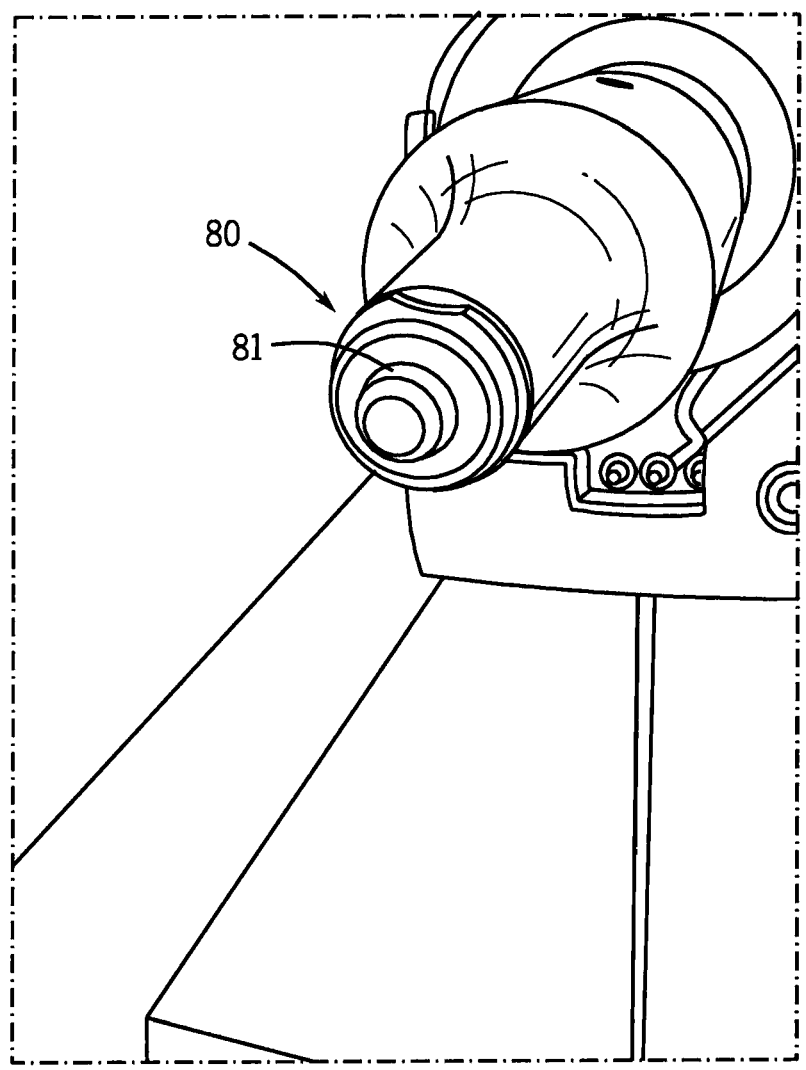
FIG. 15 is a photograph of a ultrasonic welding tip of the ultrasonic welding apparatus of FIG. 14.
Figure 24:
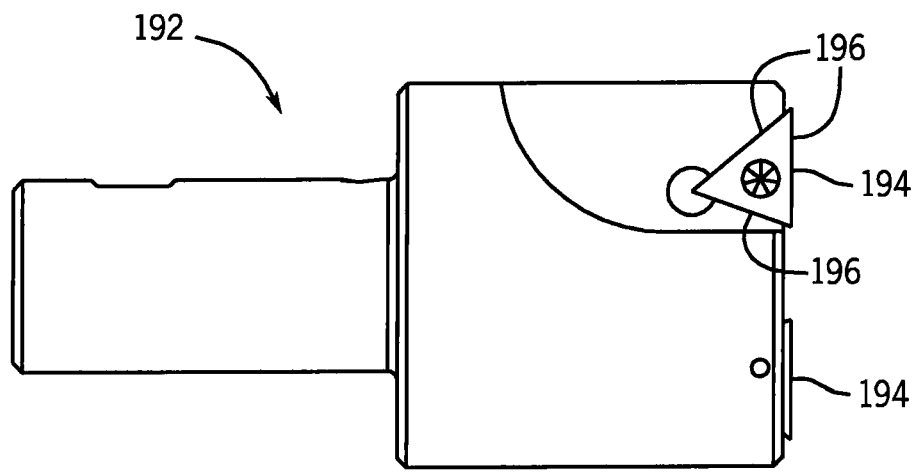
FIG. 24 is a side view of the second embodiment of the skiving tool of FIG. 23.
Figure 25:
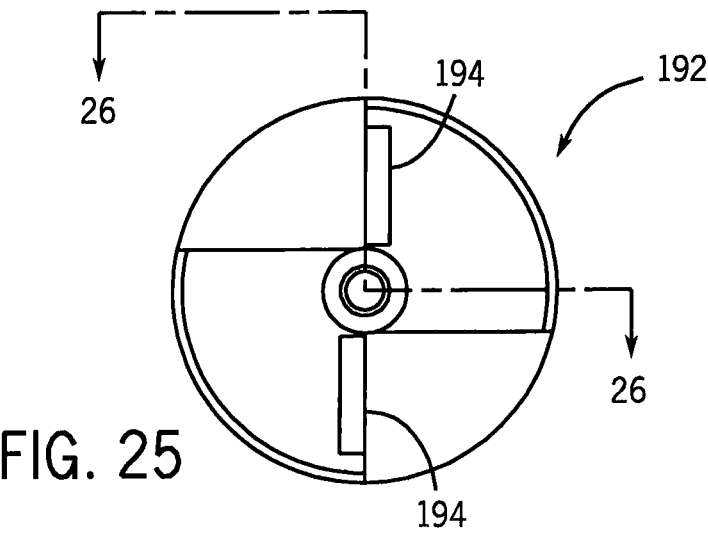
FIG. 25 is a front view of the second embodiment of the skiving tool.
Figure 26:
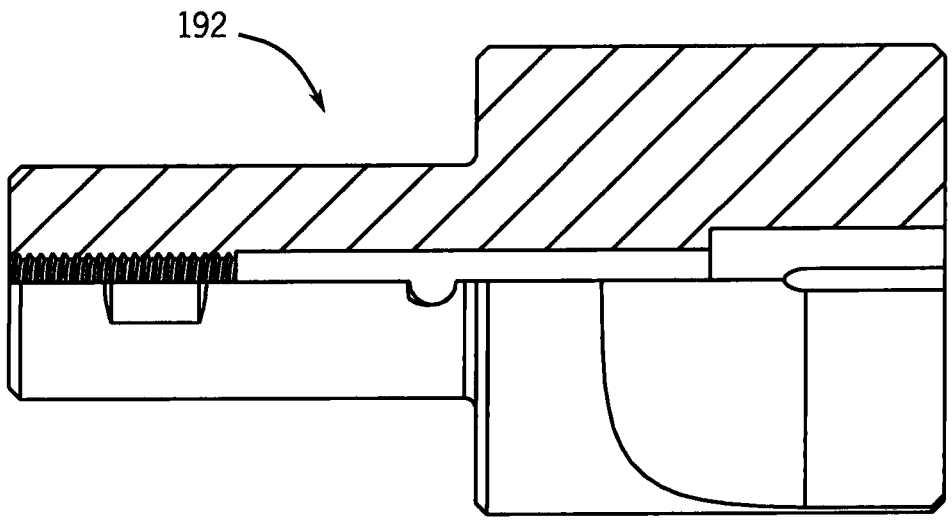
FIG. 26 is a sectional view of the skiving tool along line 26-26 of FIG. 25.
Figure 27:
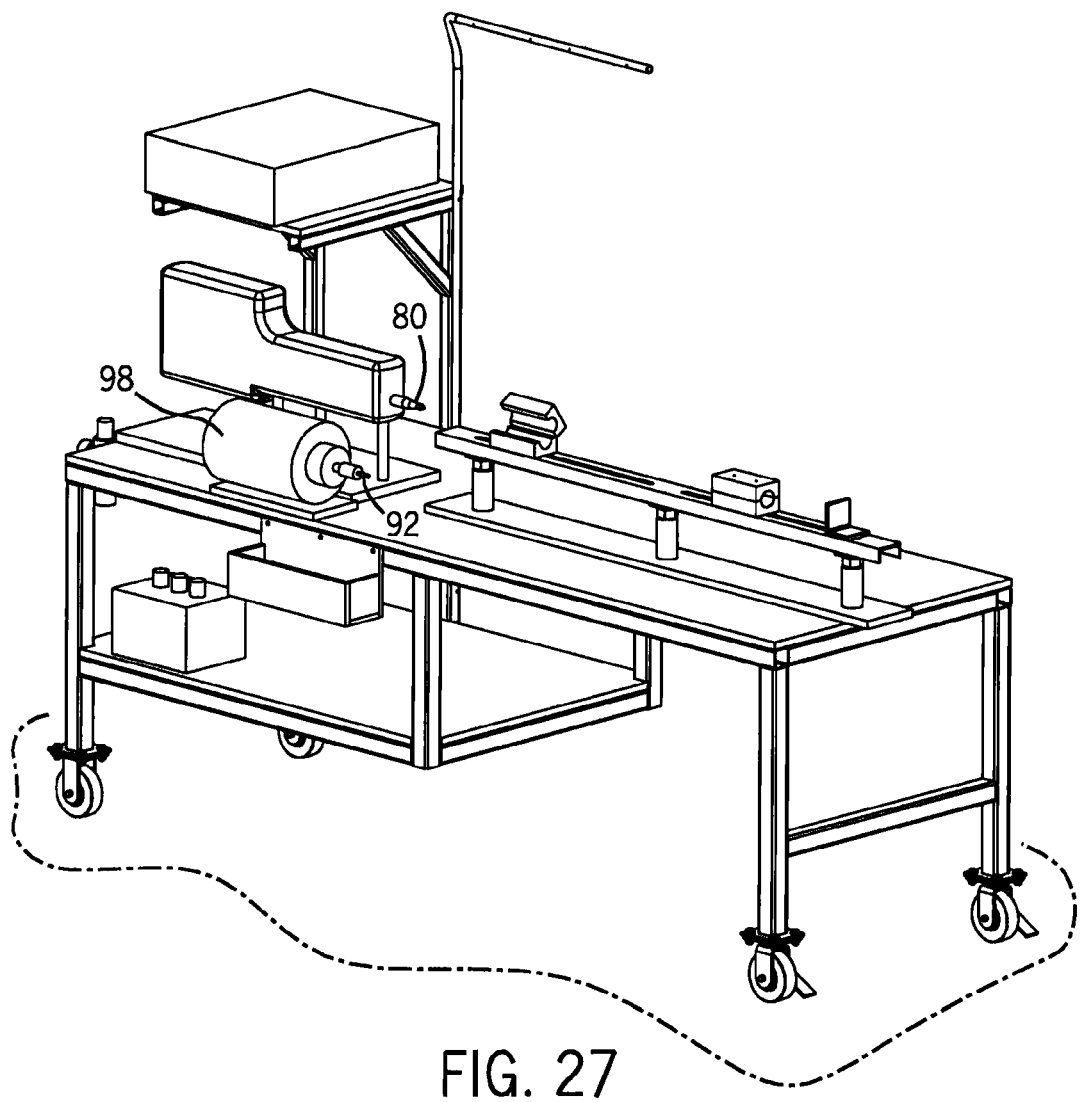
FIG. 27 is a perspective view of manufacturing cell for the transmission assembly.

The retainer 58 is next placed around the preliminary retainer projection 54' and secured to the liner 40 using an ultrasonic welding apparatus (FIGS. 14 and 15). The ultrasonic welding apparatus includes a welding tip 80 (FIG. 16) that deforms the projection 54' and provides the rivet shape on a portion of the retainer projection 54 that secures the retainer 58. The pin 81 of the welding tip 80 enters the inner passageway 52 of the sleeve 50 to prevent material from flowing into the passageway 52 and to control the size of the passageway 52 proximate the retainer 58. During ultrasonic welding, the end of the inner passageway 52 at the retainer projection 54 collapses onto the pin 81 and takes on its size and shape, so the grease retention grooves 51 of the passageway 52 are partially blocked by this collapsing, as shown in FIG. 4. In addition, the welding tip 80 also causes some material to flow and form projecting keys in the slots 72 of the retainer 58, if present, to restrain the retainer 58 against rotation. In any case, the ultrasonic welding process results in the liner and retainer assembly 90 shown in FIG. 17; i.e. with the retainer 58 fixed to the end of the liner 40.

Figure 2:
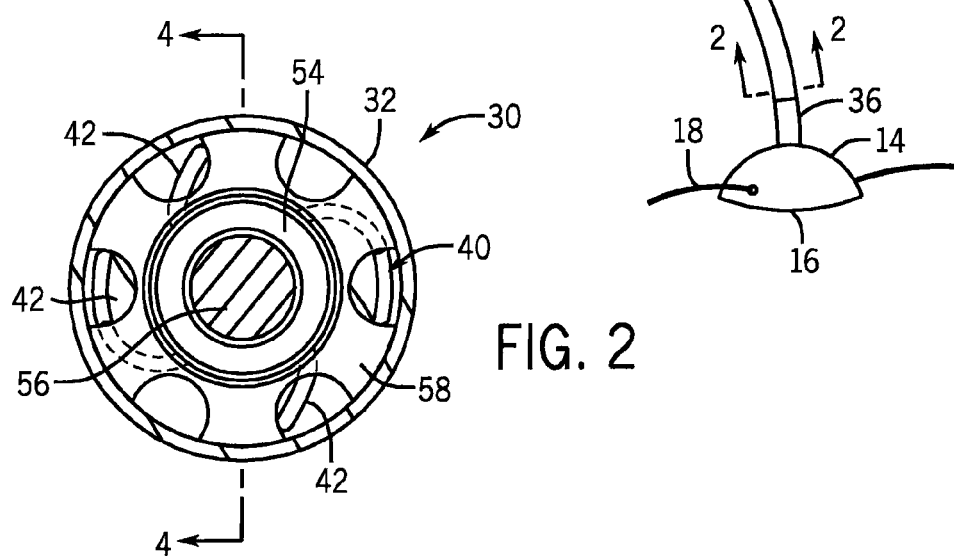
FIG. 2 is a sectional view of the transmission assembly along line 2-2 of FIG. 1.

The liner and retainer assembly 90 is next pressed into the down-tube 32. The liner and retainer assembly 90 is preferably pressed in the direction faced by the convex surface 62 of the retainer 58 due to the relatively low resistance to motion in this direction; i.e. the retainer and liner assembly 90 is pressed with the convex surface 62 entering the tube before the concave surface enters. The core 56 may be positioned in the inner passageway 52 of the sleeve 50 to provide the transmission assembly 30 as shown in FIGS. 2-4, either before or after the assembly 90 is placed in the down-tube 32.

The transmission assembly of the present invention provides a core that is accurately centered at the position of the retainer within the down-tube. The transmission assembly also restrains the flexible liner axially and radially relative to the down-tube to reduce wear, and can help restrain it against rotation relative to the down-tube.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. A transmission assembly for a string trimmer, comprising: a liner, including: a sleeve including an inner surface defining a passageway adapted to receive a rotatable core, and the sleeve further including an outer surface; a plurality of legs projecting from the outer surface; a retainer projection disposed at a position axially adjacent to the plurality of legs; and a retainer held to the liner by the retainer projection, and the retainer being configured to axially and radially restrain the liner relative to an outer down-tube, wherein the retainer projection includes at least one projecting key, and the retainer includes at least one slot that accommodates the at least one projecting key to rotatably restrain the retainer relative to the liner.

2. The transmission assembly of claim 1, wherein the retainer projection includes an ultrasonically welded portion that axially restrains the retainer relative to the liner.

3. The transmission assembly of claim 1, wherein each of the plurality of legs has an elliptical shape as viewed in a direction of a longitudinal axis of the liner.

4. The transmission assembly of claim 1, wherein each of the plurality of legs defines a helical path along a length of the liner.

5. The transmission assembly of claim 1, further comprising a flexible and rotatable core within the passageway.

6. The transmission assembly of claim 5, further comprising an outer down-tube defining a passageway in which the liner, the retainer, and the rotatable core are disposed.

7. A string trimmer comprising the transmission assembly of claim 6, and the string trimmer further comprising: a power source connected to a first end of the rotatable core and configured to rotate the core; and a rotary whip assembly connected to a second end of the rotatable core opposite the first end.

8. The string trimmer of claim 7, wherein the retainer engages a lower end of the outer down-tube proximate the second end of the rotatable core.

9. A transmission assembly for a string trimmer, comprising: a liner, including: a sleeve including an inner surface defining a passageway adapted to receive a rotatable core, and the sleeve further including an outer surface; a plurality of legs projecting from the outer surface; a retainer projection disposed at a position axially adjacent to the plurality of legs; and a retainer held to the liner by the retainer projection, and the retainer being configured to axially and radially restrain the liner relative to an outer down-tube, wherein the retainer includes a concave surface.

10. The transmission assembly of claim 9, wherein the retainer extends further radially outwardly than the plurality of legs.

11. A transmission assembly for a string trimmer, comprising: a liner, including: a sleeve including an inner surface defining a passageway for a rotatable core, and the sleeve further including an outer surface opposite the inner surface; a plurality of legs projecting from the outer surface; a retainer projection defined by the sleeve at an end of the sleeve; and a retainer axially restrained relative to the liner by the retainer projection, the retainer including a plurality of fingers configured to engage an outer down-tube and axially and radially restrain the liner relative to the outer down-tube.

12. The transmission assembly of claim 11, wherein the retainer includes a concave surface.

13. The transmission assembly of claim 11, wherein the retainer is a spring washer.

14. The transmission assembly of claim 11, wherein the retainer projection includes at least one projecting key, and the retainer includes at least one slot that accommodates the at least one projecting key to rotatably restrain the retainer relative to the liner.

15. A method of forming a transmission assembly for a string trimmer, comprising the steps of: providing a liner including: a sleeve including an inner surface defining a passageway adapted to receive a rotatable core and an outer surface opposite the inner surface; a plurality of legs projecting from the outer surface; a retainer projection disposed at a position axially adjacent to the plurality of legs; and securing a retainer to the liner using the retainer projection, the retainer being configured to axially and radially restrain the liner relative to an outer down-tube, wherein the retainer projection includes at least one projecting key, and the retainer includes at least one slot that accommodates the at least one projecting key to rotatably restrain the retainer relative to the liner.

16. The method of claim 15, wherein the liner is formed by an extrusion process.

17. The method of claim 15, wherein the retainer projection is formed by a skiving process.

18. The method of claim 15, wherein the retainer projection is deformed to secure the retainer to the liner.

19. The method of claim 18, wherein the retainer projection is deformed using an ultrasonic welding process.

20. The method of claim 15, further comprising the step of positioning the retainer in a lower end of an outer down-tube configured to connect to a rotary whip assembly of a string trimmer.

* * * * *